May 10, 1955
M. R. THORBURN
2,707,901
OPTICAL DIAGNOSTIC INSTRUMENTS
Filed June 22, 1951
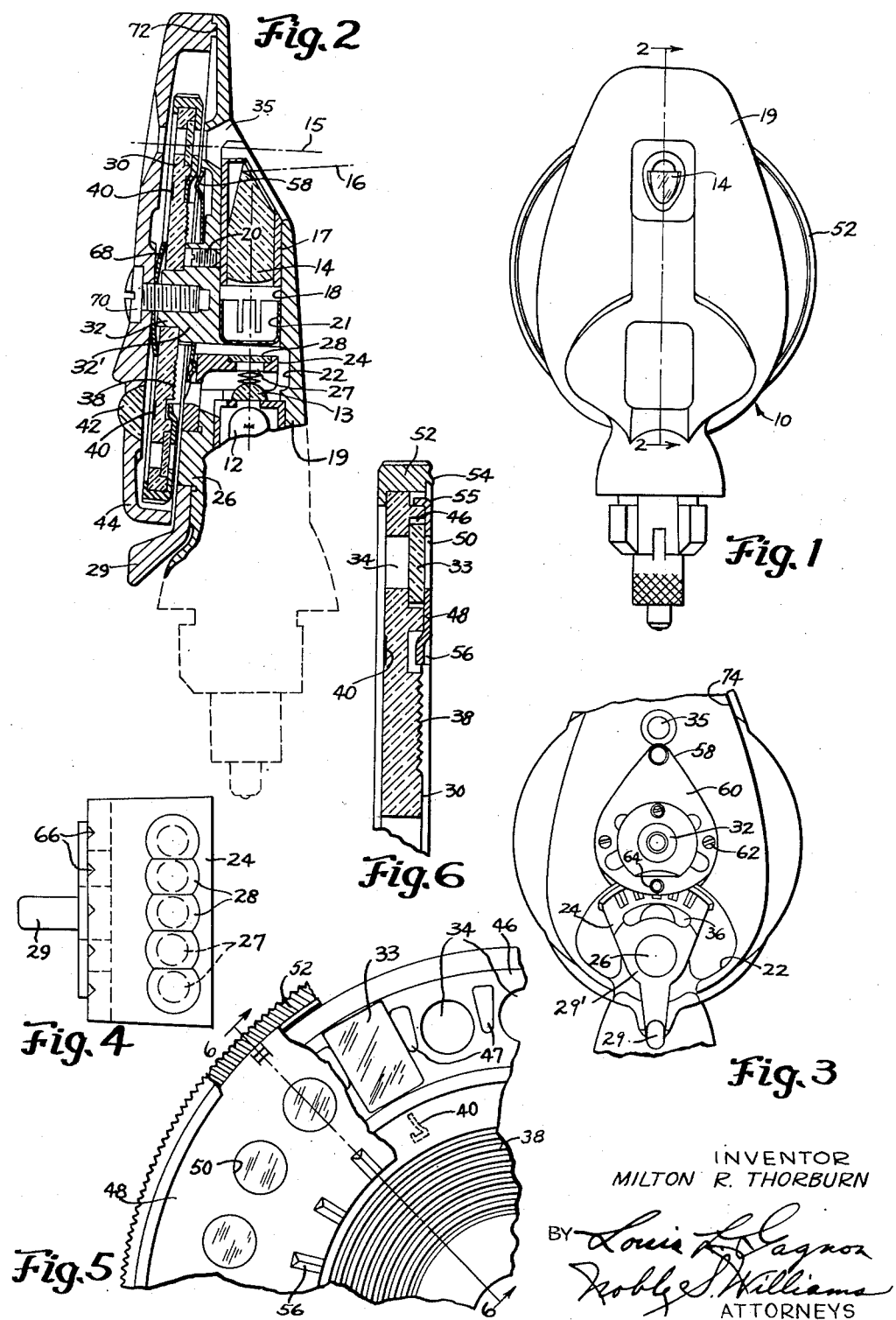
INVENTOR
MILTON R. THORBURN
BY
ATTORNEYS United States Patent Office 2,707,901
Patented May 10, 1955

2,707,901

OPTICAL DIAGNOSTIC INSTRUMENTS

Milton R. Thorburn, Williamsville, N. Y., assignor to American Optical Company, Southbridge, Mass., a voluntary association of Massachusetts Application June 22, 1951, Serial No. 232,939

8 Claims. (Cl. 88—22)

This invention relates to diagnostic instruments and the like, and more particular to hand ophthalmoscopes which are of light weight, compact, rugged and economical construction and provided with improved means conveniently arranged for controlling and altering the character of the light from a built-in light source of the instrument during use thereof.

While ophthalmoscopes have been in use for many years and have been improved in various ways, the present invention nevertheless provides in such an instrument a more compact, sturdy, economical and convenient arrangement and construction of parts than heretofore and with the parts to be controlled disposed so as to be more conveniently regulated or adjusted by the operator of the instrument during use thereof, not only with reference to the operative position of any one of a series of plus and minus lenses contained therein but also with reference to light altering means disposed in the path of the light from a built-in light source for illuminating the eye of the patient. The construction and arrangement of the instrument is such that the controls may be operated without in any way requiring an interruption in use of the instrument. Furthermore, the controls of the instrument are such that the selected positions of adjustment thereof may be readily determined without requiring reversing the position of the instrument as has often been required in ophthalmoscopes of earlier construction.

It is, accordingly, an object of the present invention to provide in a hand ophthalmoscope or the like provided with light source means incorporated therein and closely positioned to reflecting means or an illuminating prism of the instrument, readily operable light altering means for controlling the type or character of illumination being projected into a patient's eye, and control means connected to the light altering means and conveniently positioned at the side of the instrument facing the operator for actuating or adjusting the position of the light altering means.

It is an additional object of the present invention to provide in an ophthalmoscope a main rotatable lens carrier which comprises suitable wear resistant indexing and lens retaining means. Said main rotatable lens carrier also comprises novel means for directing light received from the built-in light source of the instrument diagonally or at an angle toward any one of a series of reference characters thereon, when indicating the operative position of the associated lens on the lens carrier, in such a manner that only indirect lighting of each character is provided.

It is a further object of the present invention to provide in operative relation to said light altering means and said main rotatable lens carrier suitable indexing means releasably positioning same in any one of the several predetermined operative positions as well as resilient means operatively associated with both and arranged to function in maintaining both in any pre-selected operative position.

Other objects and advantages of the present invention will become apparent from a detailed description which follows when taken in conjunction with the accompanying drawing in which:

Fig. 1 is an elevational view of a hand ophthalmoscope, embodying the present invention, as viewed from the patient's side of the instrument;

Fig. 2 is a partial sectional view of the instrument of Fig. 1, taken substantially upon section line 2—2 thereof and looking in the direction of the arrows;

Fig. 3 is a partial elevational view of the instrument of Fig. 1, but as viewed from the doctor's or operator's side thereof and with the cover plate and main rotatable lens carrier removed;

Fig. 4 is a plan view of light altering means to the instrument of Fig. 1;

Fig. 5 is a partial side view, somewhat enlarged, of the main rotatable lens carrier of Fig. 2; and Fig. 6 is a partial sectional view of the rotatable carrier and taken substantially upon section line 6—6 of Fig. 5.

Referring to the drawings in detail, it will be seen that the numeral 10 indicates generally the head portion of a hand ophthalmoscope which may be of a type arranged to be detachably secured to a handle portion of suitable construction; such as, for example, the ophthalmoscope disclosed in co-pending application No. 227,482, filed May 21, 1951, now U. S. Patent 2,678,041, issued May 11, 1954. The instrument of this earlier application contains a plurality of dry cell batteries in the handle portion thereof and suitable means for connecting the handle portion to the head as well as for connecting the batteries therein to a miniature bulb light source in the head. Such a miniature bulb of concentrated filament prefocused type is shown at 12 in Fig. 2 and adjacent thereto is a condenser lens 13 disposed so as to direct a beam of light upwardly toward an illuminating reflecting prism 14 or the like of known construction. The prism 14 is so positioned relative to a line of sight 15 through the instrument that light will be directed by the prism generally along a line 16 into the eye of a patient. The prism 14 in the present instance is cemented in a tubular sleeve 17 and this sleeve is, in turn, positioned within a vertical passage 18 in a main supporting housing 19. The sleeve 17 is held in proper axial and rotative positions of adjustment within the passage by a set screw 20. Also positioned within the passage 18 is an apertured sleeve 21 having resilient fingers for frictionally engaging the cylindrical wall of the passage.

Normally the brightness of the bulb of such a diagnostic instrument would be controlled by a rheostat (not shown) carried on the handle portion of the instrument. In this manner a control of the intensity of the light beam may be had. It is desirable, additionally, at times during use of the instrument to change the character of the light beam being projected into the patient's eye and this may be done by light altering means enabling any one of several different types of illumination to be used, such as a red filter, a green filter, a small spot of white light, a larger spot of white light or a narrow slit of light.

Different ways for accommodating such light altering means have heretofore been employed in ophthalmoscopes of earlier construction, but many of these have not been entirely satisfactory or too convenient for the operator of the instrument to use during actual use of the instrument. The present invention, however, provides an improved construction and arrangement of parts wherein between the light source 12 and the apertured sleeve 21 there is provided an enlarged chamber 22 which is of generally arcuate shape in the transverse direction of the instrument and which is of such size as to adequately accommodate a movable support or segmental carrier 24 therein as well as to allow this carrier to be pivoted about a generally horizontal extending circular boss 26 for aligning any of said apertures with the light beam between the light source 12 and the aperture in the sleeve 21. This boss 26 is preferably formed as a molded portion of the main supporting housing 19, and disposed adjacent the side of the light source 12 and on the side thereof toward the operator of the instrument. The chamber 22, in the present instance, is of such transverse dimensions, as will be seen by Fig. 3, as to accommodate the carrier 24 which has in line along its transverse arcuate surface five apertures 27 for filter elements 28 or the like.

By locating the boss 26 on the side of the instrument toward the operator, a handle portion 29 of the carrier 24 may extend downwardly and then outwardly somewhat toward the operator so as to act as a readily accessible lever. Thus, the operator may by the use of his or her thumb easily change the type or character of light being employed for eye examination purposes without interruption of the examination.

A relatively thin circular transparent main rotatable lens carrier 30 is mounted upon a shouldered hub 32 also formed integrally with the main housing 19 and extending outwardly therefrom in the same direction as the boss 26. The hub 32 allows the rotatable lens carrier 30 to be rotated thereon for positioning any one of a series of plus and minus lenses 33 in alignment with a sight opening 35 formed in the housing 19 and through which the line of sight 15 extends. The lenses 33 are carried by the carrier 30 adjacent a series of spaced apertures 34 formed in the outer rim portion of the carrier and equally radially spaced from the center of the carrier. The line of sight 15 extends across the top of the illuminating prism 14. Thus, the major portion of the main lens carrier 30 is disposed below the line of sight, and since the carrier must be of a size sufficient to accommodate an adequate number of lens elements 33 (in the present instance twenty-four), this carrier extends downwardly, considerably below the level of said light source 12. Accordingly, in order to position the manual control 29 for the segmental carrier 24 at the side of the instrument toward the operator it is preferable to arrange an intermediate portion 29' as a comparatively thin tranverse plate-like member having a pivot opening centrally therein for accommodating the boss 26.

Furthermore, since it is desirable to employ light from the light source 12 for illuminating the individual numerals or characters on the lens carrier 30 indicating the particular lens positioned at the sight opening 35, the transverse plate portion of the carrier 24 is provided with an arcuate slot 36 so positioned therein that light from the bulb 12 may pass angularly upwardly through the slot 36 to the carrier 30 to a number of circular rills 38 formed in the rear surface of the main carrier 30. The carrier 30 is preferably formed by a molding operation of Lucite, or equivalent transparent plastic material, with the rilling 38 so shaped as to reflect or refract a suitable amount of light downwardly at an angle toward any one of a series of reference characters indicating at 40, and positioned upon the opposite side of the rotatable carrier 30 when a character is disposed adjacent a magnifying lens 42 carried by a front cover 44 of the instrument. At such time the lens diagonally disposed relative thereto will be positioned at the sight opening 35.

Since the use of a circular rotatable lens carrier in an ophthalmoscope is well known in the art details thereof are not included herewith. However, it has been found convenient and desirable in the construction of such a rotatable lens carrier 30 to provide same with an annular recess 46 for the lenses circumferentially spaced around said carrier and small lens retaining stops are indicated at 47 at opposite sides of each opening 34. An annular ring of special construction 48 and apertured at 50 to agree with the openings 34 for the lenses 33 may be employed to hold all of the lenses in firm position within the recess 46 and between the stops 47. An outer flanged ring 52 having a knurled or ribbed outer edge may be slipped over the periphery of the transparent carrier 30 and when an annular bead portion 54 thereof has been spun over the peripheral edge of the annular ring 48 a firm assembly will result. A finger 55 of the ring 48 extending into a small notch in the carrier prevents relative movement therebetween. Adjacent each lens aperture 50 in ring 48 is formed or pressed a depression 56 into which the resilient detent arm portion 58 of a spring member 60 may engage for releasably retaining the rotatable carrier 30 in any desired position holding a lens in alignment with said sight opening 35.

The spring detent 60, as best seen in Fig. 3, is provided with a generally circular central opening which fits about an enlarged base portion 32' of the hub 32. The spring is secured to the hub by screws 62 and prevented from being angularly displaced in either direction about the hub thereby. An opposite resilient arm portion 64 of said detent is arranged with a small projection for engaging any one of a series of depressions 66 formed in the segmental carrier 24 and thereby serves to retain this member in any of its several positions of adjustment.

After the light source 12 and the mounting means 17 for the illuminating prism 14 and aperture sleeve 21 therefor have been inserted in the bore 18 of the housing 19 and secured in place, the segmental carrier may be slipped on to the boss 26, the spring 60 fitted over the enlarged base portion of the hub 32 and secured in place, and then the transparent rotatable carrier 30 positioned upon the smaller outer shouldered portion of the hub 32. A cupped spring washer 68 is then aligned with the hub and the outer cover 44 placed thereover and secured in place by a single central bolt or the like 70. A flange 72 on the cover 44 engaging the edges 74 of the housing 19 prevents its sidewise movement. When the cover portion 44 has been secured in place the washer 68 will maintain the main carrier 30 against the shoulder on the hub 32 and the spring member 60 will maintain both the segmental carrier and the main rotatable lens carrier firmly in any of their selected operative positions.

Having described my invention I claim:

1. A diagnostic instrument having a housing, a sight opening in a wall of said housing, a relatively thin disc-like transparent lens carrier rotatably positioned within said housing and having a plurality of lens elements thereon arranged to be selectively moved thereby into a position in alignment with said sight opening, a light source within said housing and disposed adjacent one side of said disc-like lens carrier, reflecting means within said housing adjacent said sight opening and positioned adjacent said one side of said lens carrier to direct a beam of light from said light source toward a predetermined inspection point adjacent the same side of said lens carrier but spaced from said instrument and in alignment with said sight opening, a movable support within said housing, means for pivotally mounting said support upon said housing, said support having an arcuate portion carrying a plurality of light altering means and an intermediate transverse portion disposed adjacent said one side of said lens carrier, and supported by said pivot means, and maintaining said light altering means substantially equidistantly spaced from said pivot means when movable into and out of an operative position located between said light source and said reflecting means, manually operable means disposed at the opposite side of said lens carrier and extending outwardly of said housing so as to be remote from said predetermined inspection point for pivoting said support about said pivot means and moving any one of said light altering means into and out of said operative position, said transparent lens carrier having a plurality of reference characters so positioned on said carrier as to indicate each lens when at said sight opening, said reference characters being disposed adjacent the side of said lens carrier remote from said light source, substantially opaque means disposed in back of each of said characters and spaced therefrom for preventing the passage of light directly through said lens carrier without material deviation from said light source to said reference characters, a slot in the intermediate portion of said movable support for the passage of light from said light source therethrough, and a surface formation on the side of said lens carrier opposite said reference characters and adjacent said opaque means and so angularly disposed relative thereto as to direct light from said light source through said lens carrier and angularly toward the rear side of the reference character indicating the lens at said sight opening from effecting indirect illumination thereof.

2. A diagnostic instrument having a housing, a sight opening in a wall of said housing, a relatively thin disc-like transparent lens carrier rotatably positioned within said housing and having a plurality of lens elements thereon arranged to be selectively moved thereby into a position in alignment with said sight opening, a light source within said housing and disposed adjacent one side of said disc-like lens carrier, reflecting means within said housing adjacent said sight opening and positioned adjacent one side of said lens carrier to direct a beam of light from said light source toward a predetermined inspection point adjacent the same side of said lens carrier but spaced from said instrument and in alignment with said sight opening, a movable support within said housing and carrying light altering means for movement into and out of an operative position located between said light source and said reflecting means, manually operable means disposed at the opposite side of said lens carrier and extending outwardly of said housing so as to be remote from said predetermined inspection point for moving said light altering means into and out of said operative position, an intermediate portion of said movable support being disposed between said light source and said rotatable lens carrier and serving to inter-connect said light altering means and said manually operable means, said transparent lens carrier having a plurality of reference characters so positioned on said carrier as to indicate each lens when at said sight opening, said reference characters being disposed adjacent the side of said carrier remote from said light source, substantially opaque means disposed in back of each of said reference characters and spaced therefrom for preventing the passage of light directly through said lens carrier without material deviation from said light source to said reference characters, a slot in the intermediate portion of said movable support for allowing the passage of light from said light source therethrough, and a surface formation on the side of said lens carrier opposite said reference characters and adjacent said opaque means and so angularly disposed relative thereto as to direct light from said light source through said lens carrier and angularly toward the rear side of the reference character positioned for indicating the lens aligned with said sight opening by indirect illumination thereof.

3. A rotatable lens carrier for use in a hand ophthalmoscope or the like, said carrier comprising a disc-like rotatable body member formed of light weight moldable transparent material having a plurality of apertures formed therein and substantially equally radially spaced from a pivot opening in the center thereof, a plurality of lens elements disposed adjacent and in alignment with said apertures, means on said body member for retaining said lens elements in alignment with their respective apertures, a thin wide opaque annular lens retainer of wear resistant material having a corresponding number of apertures formed therein and disposed in alignment with the apertures in said body member, a plurality of depressions formed in said retainer corresponding to the number and location of the apertures therein and serving to retain said body member and retainer in different selected positions when engaged by a spring detent of said ophthalmoscope or the like, interfitting means on said annular retainer and on said body member for precluding relative rotation therebetween, a metallic actuating ring encircling the outer edge of said body member and said lens retainer and having a pair of thin annular flanges upon opposite sides thereof peripherally engaging and pressing the opposite outer sides of said body member and said annular retainer toward each other so as to secure said retainer and said lens elements in their respective assembled operative positions upon said body member, reference characters positioned adjacent the outer side of said body member for indicating each lens aperture and so located thereon that said lens retainer is disposed in spaced relation in back of each reference character, and a plurality of annular rills formed in the side of said body member adjacent said lens retained and so angularly disposed relative to said reference characters that light from a light source when disposed at a predetermined location adjacent the outer side of said lens retainer will be directed through said body member toward said reference characters.

4. A compact lightweight readily portable hand ophthalmoscope having a housing, a pair of aligned sight openings in wall portions of said housing, a relatively thin disk-like circular lens carrier rotatably and vertically positioned in said housing on a hub portion thereof, a plurality of lens elements on said carrier and circumferentially arranged to be selectively moved thereby into a position in alignment with said sight openings, a light source within said housing and disposed closely adjacent a first side of said disk-like lens carrier near the lower half thereof, reflecting means within said housing adjacent said first side of said lens carrier near the upper half thereof and adjacent one of said sight openings for directing a beam of light from said light source toward a predetermined inspection point at the same side of said lens carrier but spaced from said instrument and in alignment with said sight openings, a movable support within said housing between said light source and said lens carrier, said movable support having an upper portion carrying light altering means movable into and out of an operative position located between said light source and said reflecting means, said movable support having a lower portion extending downwardly to a position below and adjacent said lens carrier and outwardly through an opening in said housing, and manually operable means on said lower portion of said movable support disposed outwardly of the side of said housing remote from said predetermined inspection point for moving said light altering means into and out of said operative position.

5. A compact lightweight readily portable hand ophthalmoscope having a housing, a pair of aligned sight openings in wall portions of said housing, a relatively thin disk-like circular lens carrier rotatably and vertically positioned in said housing on a hub portion thereof, a plurality of lens elements on said carrier and circumferentially arranged to be selectively moved thereby into a position in alignment with said sight openings, a light source within said housing and disposed closely adjacent a first side of said disk-like lens carrier near the lower half thereof, reflecting means within said housing adjacent said first side of said lens carrier near the upper half thereof and adjacent one of said sight openings for directing a beam of light from said light source toward a predetermined inspection point at the same side of said lens carrier but spaced from said instrument and in alignment with said sight openings, a movable support within said housing between said light source and said lens carrier, said movable support having an upper portion carrying a plurality of light altering means selectively movable into and out of an operative position located between said light source and said reflecting means, said movable support having a lower portion extending downwardly to a position below and adjacent said lens carrier and outwardly through an opening in said housing, and manually operable means on said lower portion of said movable support disposed outwardly of the side of said housing remote from said predetermined inspection point for moving any one of said light altering means into and out of said operative position.

6. A compact lightweight readily portable hand ophthalmoscope having a housing, a pair of aligned sight openings in wall portions of said housing, a relatively thin disk-like circular lens carrier rotatably and vertically positioned in said housing on a hub portion thereof, a plurality of lens elements on said carrier and circumferentially arranged to be selectively moved thereby into a position in alignment with said sight openings, a light source within said housing and disposed closely adjacent a first side of said disk-like lens carrier near the lower half thereof, reflecting means within said housing adjacent said first side of said lens carrier near the upper half thereof and adjacent one of said sight openings for directing a beam of light from said light source toward a predetermined inspection point at the same side of said lens carrier but spaced from said instrument and in alignment with said sight openings, a movable support within said housing between said light source and said lens carrier, pivot means carried by said housing and pivotally connected to said movable support at a location between said light source and said lens carrier, said movable support having an upper portion carrying light altering means movable laterally into and out of an operative position located between said light source and said reflecting means, said movable support having a lower portion extending downwardly to a position below and adjacent said lens carrier and outwardly through a laterally extending slot in said housing, and manually operable means on said lower portion of said movable support disposed outwardly of the side of said housing remote from said predetermined inspection point and movable laterally for moving said light altering means into and out of said operative position.

7. A compact lightweight readily portable hand ophthalmoscope having a housing, a pair of aligned sight openings in wall portions of said housing, a relatively thin disk-like circular lens carrier rotatably and vertically positioned in said housing on a hub portion thereof, a plurality of lens elements on said carrier and circumferentially arranged to be selectively moved thereby into a position in alignment with said sight openings, a light source within said housing and disposed closely adjacent a first side of said disk-like lens carrier near the lower half thereof, reflecting means within said housing adjacent said first side of said lens carrier near the upper half thereof and adjacent one of said sight openings for directing a beam of light from said light source toward a predetermined inspection point at the same side of said lens carrier but spaced from said instrument and in alignment with said sight openings, a movable support within said housing between said light source and said lens carrier, pivot means carried by said housing and pivotally connected to said movable support at a location between said light source and said lens carrier, said movable support having an upper arcuate portion carrying a plurality of light altering means substantially equidistantly spaced from said pivot means and selectively movable into and out of an operative position located between said light source and said reflecting means, said movable support having a lower portion extending downwardly to a position below and adjacent said lens carrier and outwardly through a laterally extending slot in said housing, and manually operable means on said lower portion of said movable support disposed outwardly of the side of said housing remote from said predetermined inspection point for moving any one of said light altering means into and out of said operative position.

8. A compact lightweight readily portable hand ophthalmoscope having a housing, a pair of aligned sight openings in wall portions of said housing, a relatively thin disk-like circular lens carrier rotatably and vertically positioned in said housing on a hub portion thereof, a plurality of lens elements on said carrier and circumferentially arranged to be selectively moved thereby into a position in alignment with said sight openings, a light source within said housing and disposed closely adjacent a first side of said disk-like lens carrier near the lower half thereof, reflecting means within said housing adjacent said first side of said lens carrier near the upper half thereof and adjacent one of said sight openings for directing a beam of light from said light source toward a predetermined inspection point at the same side of said lens carrier but spaced from said instrument and in alignment with said sight openings, a movable support within said housing between said light source and said lens carrier, pivot means carried by said housing and pivotally connected to said movable support at a location between said light source and said lens carrier, said movable support having an upper portion carrying light altering means movable laterally into and out of an operative position located between said light source and said reflecting means, said movable support having a lower portion extending downwardly to a position below and adjacent said lens carrier and outwardly through a laterally extending slot in said housing, manually operable means on said lower portion of said movable support disposed outwardly of the side of said housing remote from said predetermined inspection point and movable laterally for moving said light altering means into and out of said operative position, a plurality of indexing means on said lens carrier and on said movable support for retaining the lenses on said carrier and the light altering means on said support in their operative positions respectively, and a relatively thin substantially flat apertured detent element surrounding said hub portion and having a pair of resilient arms at least one of which is positioned between said lens carrier and movable support, said pair of resilient arms normally engaging said index means on said lens carrier and on said movable support respectively and functioning to releasably retaining same against undesired movement.

References Cited in the file of this patent

UNITED STATES PATENTS

| 1,059,715 | De Zeng | Apr. 22, 1913 |
| 1,246,495 | Tillyer | Nov. 13, 1917 |
| 1,646,763 | Murray et al. | Oct. 25, 1927 |
| 1,795,691 | Wilson | Mar. 10, 1931 |
| 2,134,279 | Arnesen | Oct. 25, 1938 |
| 2,199,188 | Rubens | Apr. 30, 1940 |
| 2,469,388 | Held | May 10, 1949 |

FOREIGN PATENTS

| 333,925 | Great Britain | Aug. 25, 1930 |